No. 624,480. Patented May 9, 1899.
J. HALEY.
APPARATUS FOR MANUFACTURING WINDOW GLASS.
(Application filed May 27, 1898.)
(No Model.) 2 Sheets—Sheet 1.
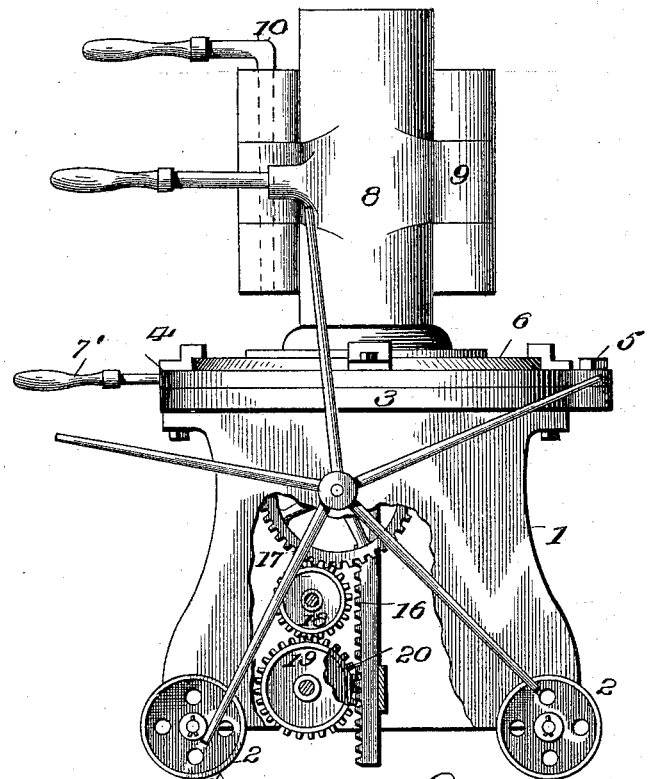
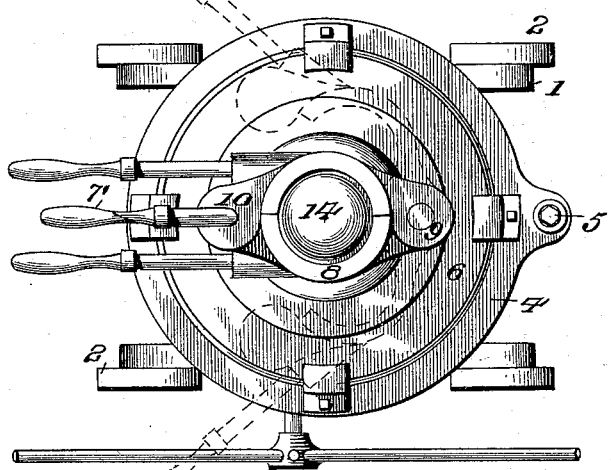
Inventor
Jonathan Haley
by Benj. R. Catlin
Attorney
Witnesses No. 624,480. Patented May 9, 1899.
J. HALEY.
APPARATUS FOR MANUFACTURING WINDOW GLASS.
(Application filed May 27, 1898.)
(No Model.) 2 Sheets—Sheet 2.
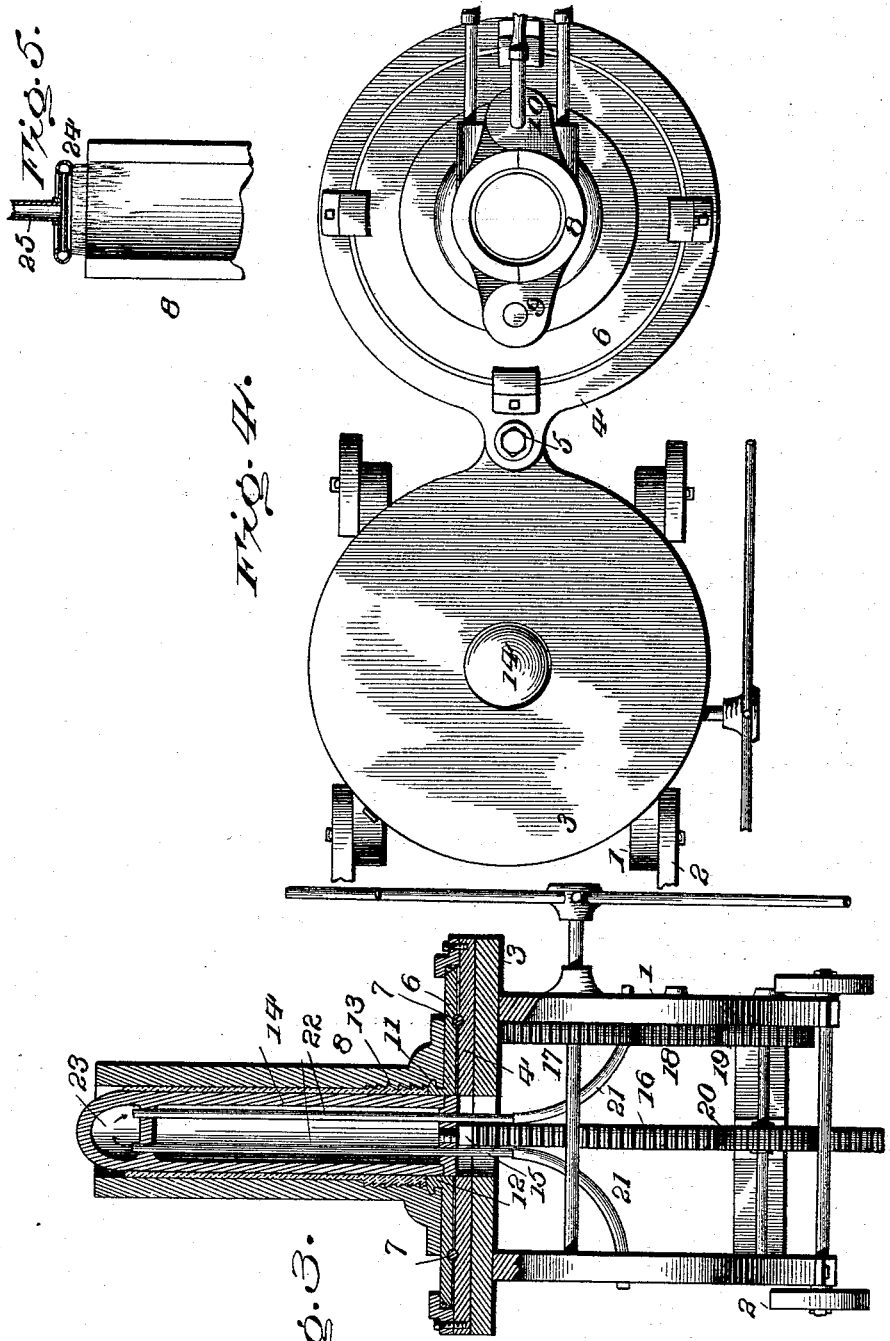

UNITED STATES PATENT OFFICE.

JONATHAN HALEY, OF BRIDGETON, NEW JERSEY, ASSIGNOR TO C. W. SHOEMAKER, OF SAME PLACE.

APPARATUS FOR MANUFACTURING WINDOW-GLASS.

SPECIFICATION forming part of Letters Patent No. 624,480, dated May 9, 1899.

Application filed May 27, 1898. Serial No. 681,871. (No model.)

*To all whom it may concern:*

Be it known that I, JONATHAN HALEY, a resident of Bridgeton, in the county of Cumberland and State of New Jersey, have invented certain new and useful Improvements in Apparatus for Manufacturing Window-Glass; and I do hereby declare the following to be a full, clear, and exact description of the invention, such as will enable others skilled in the art to which it pertains to make and use the same.

The invention relates to apparatus for the manufacture of window-glass; and its object is to increase the efficiency and economical operation of such apparatus.

The invention consists in the construction hereinafter described and pointed out.

In the accompanying drawings, Figure 1 is a side elevation of the improved apparatus. Fig. 2 is a plan of the same. Fig. 3 is a vertical section. Fig. 4 is a plan showing the mold in position to be sprayed. Fig. 5 is a partial section of mold-spraying devices.

Numeral 1 is a frame made portable by wheels 2 and having a fixed top 3. A swinging table provided with a handle is denoted by 4, and 5 is a pivot therefor.

6 denotes a mold-supporting plate provided with antifriction bearing-balls 7 and adapted to be oscillated by a handle 7'.

A two-part mold is denoted by 8, the hinge being indicated by 9 and the lock by 10. The mold has a recess 11 to engage a projection 12 of the mold-supporting plate, whereby when the mold-sections are locked together the mold is also locked to the plate.

13 denotes a series of recesses formed in the mold to receive glass when molding a cylinder for the purpose of holding down the glass against the lifting action of the plunger, which tends to rupture the cylinder that is being formed, and for the further purpose of producing a cylinder with lens-like surfaces suitable for refracting light either in the cylindrical form or in that of a flattened plate.

14 is a plunger having a stem 15, to which is mediately fixed a rack 16, moved by a gear 17, idle-wheel 18, gear 19, and wheel 20. The gears and rack are suitable for running the plunger up and down by means of its stem, which in its lower position will extend down into a pit or below the floor.

21 denotes flexible pipes connected to tubes 22, supported within the plunger and adapted to circulate a cooling medium through the chamber 23.

In operation molten glass is poured and the plunger moved up in the mold, water being circulated through the chamber 22 and the mold and its supporting-plate oscillated about the plunger to obviate mold-marks and aid the penetration of the plunger. The oscillation also helps to perfect the above-described refracting parts.

The use of water may be suspended or omitted, and the rotary movement of the mold may be varied in extent as found most desirable under particular circumstances.

To wash the mold, the swinging table is turned about its pivot to the situation indicated in Fig. 4. Water is then discharged from a perforated head 24 of annular form, supplied by a pipe 25, suitably supported in a proper situation. This obviates lifting and carrying the mold to a washer.

Obviously the means of forming the lenses or refracting-surfaces may be made more or less extensive and may have other forms not inconsistent with the improvement.

The use of the improved means for washing is independent of other improvements, as also is the oscillating mold-plate and the particular means of cooling the plunger.

Having described my invention, I claim—

1. In an apparatus for making glass cylinders, a mold-plate, a mold-supporting table, and a pivot connecting the plate and table eccentrically, whereby the mold-plate and mold can be moved horizontally to one side of the table and remain supported thereon.

2. In an apparatus for making glass cylinders, a mold-supporting table, a horizontally-swinging mold-supporting plate pivoted eccentrically to the table to move the mold from over the supporting-table, and a washer situated over the path of the plate and outside the circumference of the table, substantially as described.

3. In an apparatus for making glass cylinders, a plunger to form the interior of a molded cylinder, a mold to form the exterior of the cylinder, a mold-plate fixed to the mold, and means distinct from the plunger to oscillate the plate and mold about said plunger in a plane transverse thereto whereby exterior lengthwise mold-marks are removed and whereby the metal is distributed about the plunger.

4. In an apparatus for making glass cylinders, a mold, a mold-plate fixed thereto, a mold-supporting plate situated below and having parts fixed thereto extended above and engaging the upper side of the mold-plate, said plate being adapted to be oscillated in a plane transverse to the axis of the mold, and antifriction-balls above and below the mold-plate and between it and the supporting-plate and its fixed parts.

5. In an apparatus for making glass cylinders, a plunger, a sectional mold having annular unobstructed recesses of lens-like shape to form refracting-surfaces in the cylinder, and means for rotating the mold to press the metal into the recesses and remove the marks of the mold-sections.

In testimony whereof I have signed this specification in the presence of two subscribing witnesses.

JONATHAN HALEY.

Witnesses:
 ISAAC L. STETSER,
 WALTER H. BACON.